United States Patent
Blomqvist et al.

(10) Patent No.: US 12,446,816 B2
(45) Date of Patent: Oct. 21, 2025

(54) SYSTEM FOR ELECTROCARDIOGRAM (ECG) ELECTRODE COUNT ADJUSTMENT AND ASSOCIATED METHODS

(71) Applicant: GE Precision Healthcare LLC, Wauwatosa, WI (US)

(72) Inventors: Kim Blomqvist, Uusimaa (FI); Janne Vihtori Klemetti, Uusimaa (FI)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 858 days.

(21) Appl. No.: 17/652,904

(22) Filed: Feb. 28, 2022

(65) Prior Publication Data
US 2023/0270366 A1 Aug. 31, 2023

(51) Int. Cl.
*A61B 5/274* (2021.01)
*A61B 5/00* (2006.01)
*A61B 5/28* (2021.01)

(52) U.S. Cl.
CPC ............ *A61B 5/274* (2021.01); *A61B 5/0006* (2013.01); *A61B 5/0024* (2013.01); *A61B 5/28* (2021.01)

(58) Field of Classification Search
CPC ......... A61B 5/271; A61B 5/273; A61B 5/274; A61B 5/282; A61B 5/288
See application file for complete search history.

(56) References Cited

U.S. PATENT DOCUMENTS

| | | | |
|---|---|---|---|
| 5,184,620 A * | 2/1993 | Cudahy | A61B 5/282 600/382 |
| 5,582,180 A * | 12/1996 | Manset | A61B 5/308 600/382 |
| 8,568,160 B2 | 10/2013 | Coggins et al. | |
| 2008/0312520 A1* | 12/2008 | Rowlandson | A61N 1/0484 600/372 |
| 2015/0005608 A1* | 1/2015 | Evans | A61B 5/30 600/382 |
| 2022/0322989 A1* | 10/2022 | Garcia | A61B 5/30 |

FOREIGN PATENT DOCUMENTS

| | | | | |
|---|---|---|---|---|
| EP | 3782545 A1 * | 2/2021 | | A61B 5/303 |
| EP | 4046573 A1 * | 8/2022 | | A61B 5/257 |

* cited by examiner

*Primary Examiner* — Eun Hwa Kim
(74) *Attorney, Agent, or Firm* — McCoy Russell LLP (57) ABSTRACT

Methods and systems are provided for selectively increasing an electrode count in a bio signal monitoring system via an extension connector. In an example, a bio signal monitoring system may comprise an integrated electrode coupler configured to be selectively connected to one or more removable electrodes via one or more corresponding extension cables. In this way, electrodes may be added or removed from the bio signal monitoring system based on a monitoring process selected.

16 Claims, 3 Drawing Sheets

SYSTEM FOR ELECTROCARDIOGRAM (ECG) ELECTRODE COUNT ADJUSTMENT AND ASSOCIATED METHODS

FIELD

Embodiments of the subject matter disclosed herein relate to increasing an ECG electrode count via an extension connector.

BACKGROUND

Electrocardiograph (ECG) monitors are widely used to obtain medical (i.e. biopotential) signals containing information indicative of electrical activity associated with the heart and pulmonary system of a patient. To obtain medical signals, ECG electrodes are applied to the skin of the patient in various locations. The electrodes, after being positioned on the patient, connect to an ECG monitor by a set of ECG lead wires. The distal end of the ECG lead wire, or portion closest to the patient, may include a connector which is adapted to operably connect to the electrode to receive medical signals from the body. The proximal end of the ECG lead set is operably coupled to the ECG monitor and supplies the medical signals received from the body to the ECG monitor. A typical ECG electrode assembly may include an electrically conductive layer connected to an electrode grabber or snapper, the assembly having a patient contact side and a connector side.

SUMMARY

In one aspect, a system includes biological, or bio, signal monitoring system, comprising: an integrated electrode coupler configured to be selectively connected to one or more removable electrodes via one or more corresponding extension cables, the integrated electrode coupler providing an electrical pass-through connection for each connected extension cable without interference from any other connected extension cable or connected electrode. In this way, additional electrodes may be selectively added to an ECG system based on the desired ECG procedure and patient characteristics.

The above advantages, other advantages, and features of the present description will be readily apparent from the following detailed description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Embodiments of the present disclosure will now be described, by way of example, with reference to the FIGS. 1-3, which relate to various embodiments for increasing an ECG electrode count via an extension connector. The extension connector may be configured in an electrode coupler for connecting an extension cable and an additional electrode. For example, an electrode may include a multi-electrode coupler configured to couple the electrode to the terminal and also configured to provide an electrical pass-through connection for one or more extension cables each coupled to a removable electrode, without interference from any other connected extension cable or connected electrode.

ECG systems may include a fixed number of electrodes connected to a terminal. A connection between two electrodes (or between an electrode and the terminal) may form an ECG lead. Each lead may measure a specific electric potential difference based on a position of the electrode on the body of the patient. The number of leads desired for an ECG measurement may be different based on a procedure selected by an operator (medical professional) and characteristics of the patient. In an ECG setup especially for a mobile or wearable ECG system, it might be difficult to adjust the number of leads.

The present disclosure at least partially addressed the above described issues by providing a system for including an extension connector to one of the ECG leads. An electrode coupler (which may include a grabber or a snapper) connected to the terminal may include two or more connections, one for a dedicated electrode and one or more for one or more additional, removable electrodes via one or more extension cables. Each extension cable may be coupled to an additional electrode. Based on the number of leads desired for a procedure, one or more additional electrodes may be selectively connected to the electrode coupler via extension cables.

In this way, the number of leads used in an ECG procedure may be adjusted based on the procedure. Thus, the ECG system may not be confined to a fixed number of leads. The technical effect of using an electrode coupler with multiple connections to the terminal is that extension cables and additional electrodes may be added or removed from a mobile or wearable ECG system, thereby maintaining the portability and ease of operation of the system.

Figure 1:
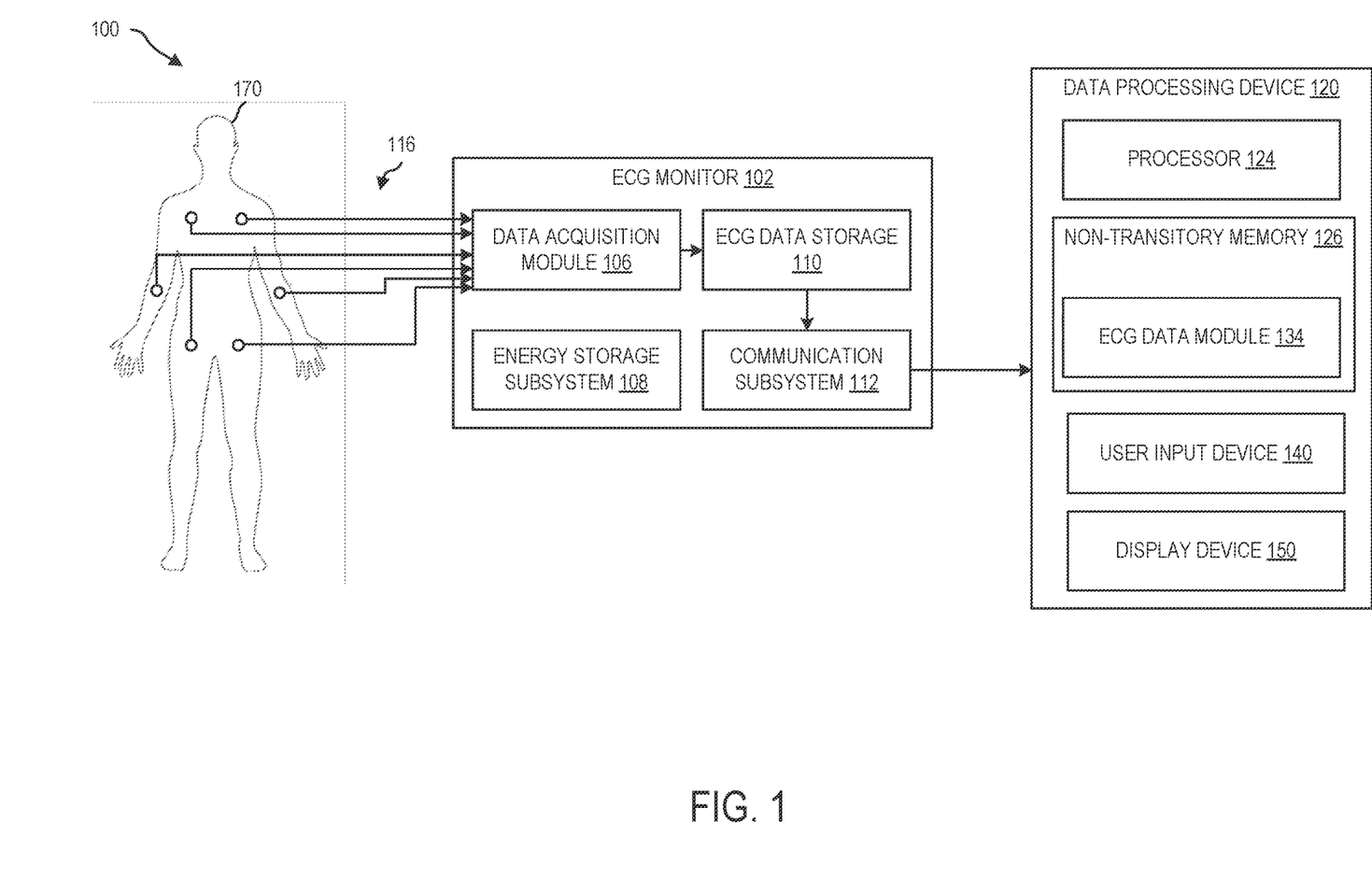
FIG. 1 shows a block diagram of a patient monitoring system, including a multi-lead electrocardiograph (ECG) system.

FIG. 1 shows a patient monitoring system that may be used to acquire electrocardiograph (ECG) data. The ECG data may be acquired using an ECG system with a variable electrode count, as shown in the ECG system of FIG. 2. A number of electrodes of the ECG system may be adjusted based on a selected ECG procedure, as discussed in FIG. 3.

Turning now to the figures, FIG. 1 shows an embodiment of a patient monitoring system 100. The patient monitoring system 100 comprises an ECG monitor 102 and a data processing device 120 communicably coupled thereto. The ECG monitor 102 is configured to measure and store a recording of the electrical activity of the heart of a patient 170 and comprises a plurality of electrodes 116. The ECG data recorded by the ECG monitor 102 comprises time series data, wherein an electric potential difference (voltage) between two or more electrodes 116 in electrical contact with the skin of the patient 170 is recorded as a function of time. Although FIG. 1 includes the ECG monitor 102, it may be appreciated that other devices that record heart activity through time may be used, such as an inertial sensor that records periodic movement, for example. The ECG monitor may further include a controller to adjust ECG acquisition based on user input.

The ECG data acquired by the ECG monitor 102 may be transferred to the data processing device 120 for further processing before being evaluated by a healthcare professional, such as a cardiologist. The healthcare professional may evaluate the ECG data acquired by the ECG monitor 102 for signs of an arrhythmia or another cardiac disorder. In the embodiment shown in FIG. 1, the plurality of electrodes 116 include five regular electrodes and one additional (e.g., removable) electrode connected via an extension connector, which are attached to the patient 170 via adhesive pads and/or electrically conductive gel. The connectors described herein may include a signal transmission wire encapsulated by an insulating protector around the signal transmission wire.

Thus, in the present example, the plurality of electrodes 116 are configured to measure a five lead ECG, wherein the electric potential is measured along distinct axes passing through the heart of the patient 170. From these measured five leads, more leads may be calculated. For example, from the measured limb leads, augmented limb leads may be calculated. Thus, this system may provide more leads than what it measures (e.g. 5+3 leads). However, it may be appreciated that the ECG monitor 102 may comprise more or fewer than five electrodes. Similarly, the placement of the electrodes 116 on the patient 170 may differ without departing from the scope of this disclosure.

The plurality of electrodes 116 may be electrically coupled to a data acquisition module 106 of the ECG monitor 102. The data acquisition module 106 is configured to measure electric potential differences between two or more of the plurality of electrodes 116 or between an electrode and a terminal as a function of time and record the measurement in an ECG data storage 110. In some embodiments, the data acquisition module 106 may be configured to receive analog electrical signals from the plurality of electrodes 116, amplify and/or filter the analog signals, and convert the analog signals to digital signals before storing the digital signals as a function of time in the ECG data storage 110. In another embodiment, the data acquisition module 106 may convert the analog electrical signals from the plurality of electrodes 116 to a digital signal and may amplify and/or filter the digital signal before storing the digital signal as a function of time in the ECG data storage 110. The measurement of electric potential difference may always be a differential between two electrodes (two potentials) or combination of potentials in case when Wilson's central terminal (WCT) potential is used as a reference when measuring a chest lead (chest-electrode potential minus WCT-potential). Often WCT-potential is not provided in analog electronics, but the chest lead is measured by referencing to RA-electrode potential (chest-electrode potential minus RA-electrode potential). In this case the WCT-referenced chest lead is calculated afterwards.

The data acquisition module 106 is communicably coupled with the ECG data storage 110 and may write ECG data acquired from the patient 170 to the ECG data storage 110. The ECG data storage 110 may comprise non-transitory memory, wherein the ECG data acquired by the data acquisition module 106 may be stored. The ECG data stored in ECG data storage 110 may comprise time series data, wherein an amplitude of the electric potential difference between two or more of the plurality of electrodes 116 or between an electrode and a terminal is recorded at regular intervals in time. For example, each recorded electric potential difference may be time stamped with the time of acquisition, thereby creating time series data. A storage capacity of the ECG data storage 110 may be selected such that an expected number of beats from one or more ECG monitor recordings may be stored thereon. In some embodiments, the ECG data storage 110 may comprise a removable component, enabling a user to physically remove the ECG data storage 110 from the ECG monitor 102. In some embodiments, the ECG data storage 110 may comprise a memory card, a flash drive, or a removable hard drive. In some embodiments, the ECG data storage 110 may be integrated into the ECG monitor 102 and may include a solid state drive (SSD), hard disk drive (HDD).

The ECG monitor 102 further comprises an energy storage subsystem 108, wherein electrical energy may be stored, enabling the ECG monitor 102 to operate while attached to a patient for hours or days without the patient to plugging the ECG monitor into an outlet. In some embodiments, the energy storage subsystem 108 comprises a rechargeable battery.

In some embodiments, a communication subsystem 112 may reversibly communicably couple the ECG monitor 102 and the data processing device 120. In one embodiment, the communication subsystem 112 may comprise a wireless or wired connection configured to transfer ECG data from the ECG data storage 110 of the ECG monitor 102 to the data processing device 120. In some embodiments, the communication subsystem 112 may enable the ECG monitor 102 and the data processing device 120 to be in substantially continuous communication via a wireless network, enabling the data processing device 120 to receive substantially real-time ECG data from the ECG monitor 102. As used herein, the term "real-time" refers to a process executed without intentional delay. The communication subsystem 112 may include wired and/or wireless communication devices compatible with one or more different communication protocols. As non-limiting examples, the communication subsystem 112 may be configured to transfer ECG data from the ECG data storage 110 to the data processing device 120 via a wireless network, a wireless local area network, a wired local area network, a wireless wide area network, a wired network, etc. In some embodiments, the communication subsystem 112 may allow the ECG monitor 102 to send and/or receive data to and/or from other devices via a network, such as the public Internet. For example, the communication subsystem 112 may communicatively couple the ECG monitor 102 with the data processing device 120 via a network, such as the public Internet.

ECG data acquired by the ECG monitor 102 may be transferred to the data processing device 120 for long term storage, processing (e.g., signal filtering, normalization, noise suppression, etc.), display, and analysis. In one embodiment, the data processing device 120 may comprise a processor 124 configured to execute machine readable instructions stored in a non-transitory memory 126. The processor 124 may be single core or multi-core, and the programs executed thereon may be configured for parallel or distributed processing. In some embodiments, the processor 124 may optionally include individual components that are distributed throughout two or more devices, which may be remotely located and/or configured for coordinated processing. In some embodiments, one or more aspects of the processor 124 may be virtualized and executed by remotely-accessible networked computing devices configured in a cloud computing configuration. In some embodiments, the non-transitory memory 126 may include components disposed at two or more devices, which may be remotely located and/or configured for coordinated processing. In some embodiments, one or more aspects of the non-transitory memory 126 may include remotely-accessible networked storage devices configured in a cloud computing configuration.

The non-transitory memory 126 further includes a data storage module 134, which may include ECG monitor data collected from one or more patients. In some embodiments, the data storage module 134 may receive ECG data from ECG monitor 102 and may store the ECG data received therefrom. In some embodiments, the data processing device 120 may receive ECG data and vital sign data from a plurality of data sources, including one or more network devices. Data stored within the data storage module 134 may be organized according to one or more known organizational schemes or configured into one or more known data structures. In some embodiments, the ECG data may be stored in the data storage module 134 by indexing the data according to patient, acquisition time, originating monitor ID, and so forth.

The data processing device 120 further includes a user input device 140 and a display device 150. The user input device 140 may comprise one or more of a touchscreen, a keyboard, a mouse, a trackpad, a motion sensing camera, or other device configured to enable a user to enter, interact with, and/or manipulate, data within the data processing device 120. The user input device 140 may also enable a user to input a desired ECG procedure for the ECG monitor 102. Based on the ECG procedure desired by the user, the controller of the ECG module may determine a number of ECG electrodes/lead wires desired for the ECG acquisition.

The display device 150 may include one or more display devices utilizing any type of display technology, such as a monitor, touchscreen, and/or projector. In some embodiments, the display device 150 may comprise a computer monitor and may display unprocessed and/or processed ECG data. The display device 150 may be combined with the processor 124, the non-transitory memory 126, and/or the user input device 140 in a shared enclosure or may be a peripheral device.

An example ECG system may include a first set of fixed electrodes connected to a terminal, and a second set of removable electrodes configured to be selectively connected to the terminal via one or more integrated electrode couplers (e.g., grabbers or snappers) and corresponding extension cables. Each integrated electrode coupler may be configured to couple to a respective electrode of the first set of fixed electrodes and may include an integrated secondary coupling mechanism, such that ach integrated electrode coupler may be configured to couple to an extension cable. For example, an integrated electrode coupler may include a snapper configured to couple to a grabber at a first end of an extension cable (or vice versa, such that the integrated electrode coupler includes a grabber configured to couple to a snapper at the first end of the extension cable). The other end of the extension cable (e.g., a second end) may terminate with an electrode or with a coupler (e.g., grabber/snapper) to which the electrode is connected. The terminal may include one or more of a data acquisition unit, a data storage unit, a data processing device, and a communication system. Each of the one or more integrated electrode couplers may be connected to the terminal via at least two connectors, with one of the at least two connectors connected to the fixed electrode of the first set (with which the integrated electrode coupler is integrated) and another of the at least two connectors connected to a removable electrode of the second set (via the extension cable). Each removable electrode may be coupled to a corresponding extension cable such that a number of removable electrodes in the second set of electrodes may be equal to a number of extension cables configured to be connected to the one or more integrated electrode couplers. One or more single electrode couplers may be connected to the terminal, each of the one or more single electrode couplers connecting one corresponding fixed electrode of the first set of electrodes to the terminal. Each of the one or more single electrode couplers and the one or more integrated electrode couplers may be connected to the terminal via a central connector. In one example, the first set of fixed electrodes may include five electrodes with one electrode of the five electrodes including an integrated electrode coupler and the second set of removable electrodes may include one electrode connected to the integrated electrode coupler.

It may be understood that the patient monitoring system 100 shown in FIG. 1 is one exemplary embodiment, and other patient monitoring systems having similar components may also be possible. For example, another appropriate patient monitoring system may include more, fewer, or different components. In one example, the ECG system may be a portable or a wearable device where the ECG monitor, and one or more components of the data processing device may be included within a terminal of the ECG system. The terminal may be a portable device that may be hand held or attached to the patient via a fastener (such as a belt).

Figure 2:
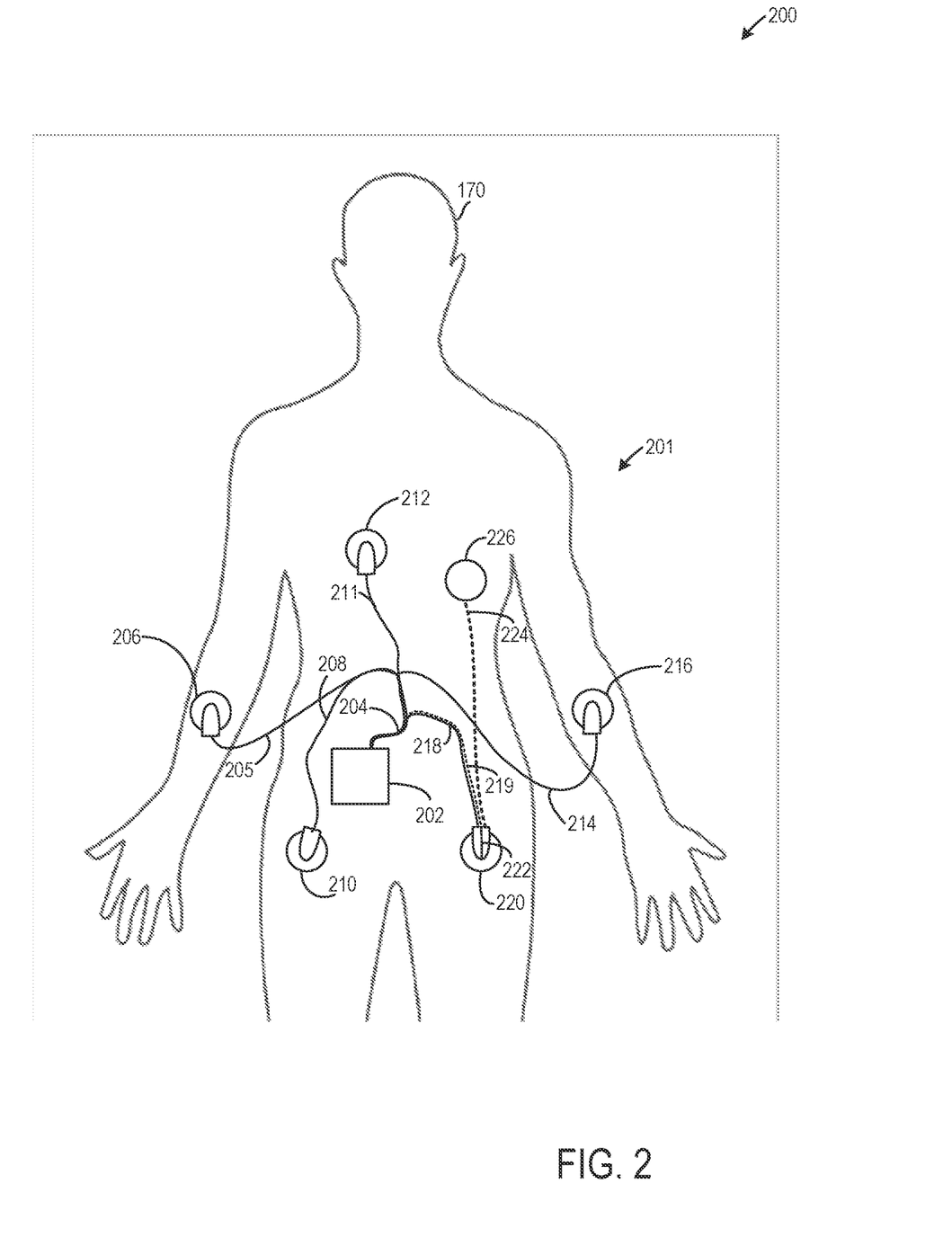
FIG. 2 shows an ECG system with an extension connector.

FIG. 2 shows an ECG system 201 with an extension connector. The ECG system 201 may be a wearable or portable ECG system with a terminal 202 that may be attached to the body of a patient 170 during ECG monitoring of the patient. The terminal may include one or more components of the ECG monitor 102 and data processing device 120 of FIG. 1.

A fixed number of electrodes may be connected to the terminal with a connection between two electrodes or between an electrode and the terminal forming a lead. A set of two lead wires may be used to measure a specific electric potential difference between two electrodes positioned on the body of the patient. The number of leads desired for an ECG measurement may be different based on a procedure selected by an operator and characteristics of the patient.

A central connector 204 may link each electrode to the terminal via respective connectors and electrode coupler. In this example, the ECG system has five fixed electrodes that may be placed at different positions of the patient's body. A first electrode 206 may be placed in a right forearm or wrist (RA) of the patient and may be connected to the terminal via a first connector 205 and a corresponding electrode coupler. A second electrode 210 may be placed in a right lower leg (RL) of the patient and may be connected to the terminal via a second connector 208 and a corresponding electrode coupler. A third electrode 212 may be placed in an intercostal space (Vn) of the patient and may be connected to the terminal via a third connector 211 and a corresponding electrode coupler. A fourth electrode 216 may be placed in a left forearm or wrist (LA) of the patient and may be connected to the terminal via a fourth connector 214 and a corresponding electrode coupler. A fifth electrode 220 may be placed in a left leg (LL) of the patient and may be connected to the terminal via a fifth connector 218 and an integrated electrode coupler 222.

The integrated electrode coupler 222 may have two or more divisions, with one division used as a connection for the fifth electrode 220. The integrated electrode coupler 222 may be coupled to the terminal via two or more separate connectors, the number of separate connectors the same as the number of divisions in the integrated electrode coupler 222. As an example, if the integrated electrode coupler 222 includes two divisions, two separate connectors may couple the terminal 202 to the integrated electrode coupler 222 and two separate electrodes may be connected to the integrated electrode coupler 222 (e.g., one fixed electrode and one removable electrode). As another example, if the integrated electrode coupler 222 includes three divisions, three separate connectors may couple the terminal 202 to the integrated electrode coupler 222 and three separate electrodes may be connected to the integrated electrode coupler 222.

In this example, the integrated electrode coupler 222 may be connected to the terminal 202 via the fifth connector 218 and a sixth connector 219. A first part of the integrated electrode coupler 222 may be connected to the fifth electrode 220 while a second part of the integrated electrode coupler 222 may be selectively used to connect a sixth (optional) electrode 226 via an extension cable 224. As an example, the sixth electrode 226 may be placed in another intercostal space (Vn) of the patient. The sixth electrode 226 may communicate with the terminal 202 via the extension cable 224 and the sixth connector 219. Based on the procedure selected by the operator, if one or more additional lead wires are desired (in addition to the five existing leads), extension cables may be connected to the integrated electrode coupler 222 to add in extra electrodes. In this way, the sixth electrode 226 and the extension cable 224 may be attached or detached to the ECG system based on the ECG procedure selected by the operator.

In an example, the integrated electrode coupler 222 may connect the output of the fifth electrode 220 to fifth connector 218. The integrated electrode coupler 222 also connects the output of sixth electrode 226, via extension cable 224, to sixth connector 219.. In some examples, fifth connector 218 and sixth connector 219 may form an integrated connector such that the signal wire forming the fifth connector 218 and the signal wire forming the sixth connector 219 are encapsulated by the same/a common encapsulating material (though the signal wires may be encapsulated such that the signal wires are isolated from each other via the encapsulating material). For example, the right half of the integrated electrode coupler 222 may be a pass through to the sixth connector 219 that bypasses any output or interaction with output of fifth electrode 220. Therefore, the integrated electrode coupler 222 may provide an electrical pass-through connection for the one or more additional removable electrodes such as sixth electrode 226 without interference from any of the fixed electrodes (e.g., the first through fifth electrodes).

In this way, the separate output of each of the fifth electrode 220 and sixth electrode 226 can both be transmitted (via the integrated electrode coupler 222), separately and without interaction therebetween, to terminal 202, which may then transmit, display, process, or combinations thereof, the received outputs of the electrodes. In doing so, the integrated electrode coupler 222 includes multiple, integrated coupling portions and acts as a multi-electrode coupler in that the integrated electrode coupler 222 facilitates signal transmission from two or more electrodes to the terminal in one single, integrated unit.

In this example, one integrated electrode coupler 222 is shown; however, in other examples, the ECG system may include more than one integrated electrode coupler, with each integrated electrode coupler configured to connect at least two electrodes to the terminal. As an example, an ECG system may include an integrated electrode coupler configured to be selectively connected to one or more removable electrodes via one or more corresponding extension cables. The integrated electrode coupler may be connected to one of the fixed electrodes and the one or more extension cables and the integrated electrode coupler may be connected to the terminal of the ECG system via two or more connectors. Each of the fixed electrodes that includes an integrated electrode coupler may be configured to transfer a signal to the terminal via one of the two or more connectors, and each of the one or more removable electrodes may be configured to transfer a signal to the terminal via a respective corresponding extension cable and one of the two or more connectors of the integrated electrode coupler.

Further, in some examples, the electrodes discussed herein may be disposable electrodes and as such may not be fixedly coupled to the connectors or terminal. Rather, the ECG system disclosed herein may include a subset of connectors that may terminate at a respective, single electrode coupler at one end and may be configured to couple to a terminal at another end. Each single electrode coupler may be configured to couple to one respective electrode. The ECG system may include another subset of connectors that may terminate at a multi-electrode coupler (e.g., coupler 222) at one end and may be configured to couple to the terminal at the other end. For example, in FIG. 2, four connectors may terminate at/be coupled to four respective single electrode couplers while two connectors may terminate at/be coupled to one multi-electrode coupler, with all six connectors coupled to the terminal. The multi-electrode coupler may be configured to couple directly to a first electrode in a conventional manner (e.g., via a grabber/snapper configuration as described above) and be configured to couple to a second electrode via an extension cable.

Although the selective extension of the number of electrodes is shown here in relation to an ECG system, the same arrangement may be used for any comparable bio signal monitoring system such as a sensor measuring impedance pneumograms for indirect measurement of respiration that uses one or more electrodes placed in contact with a patient.

Figure 3:
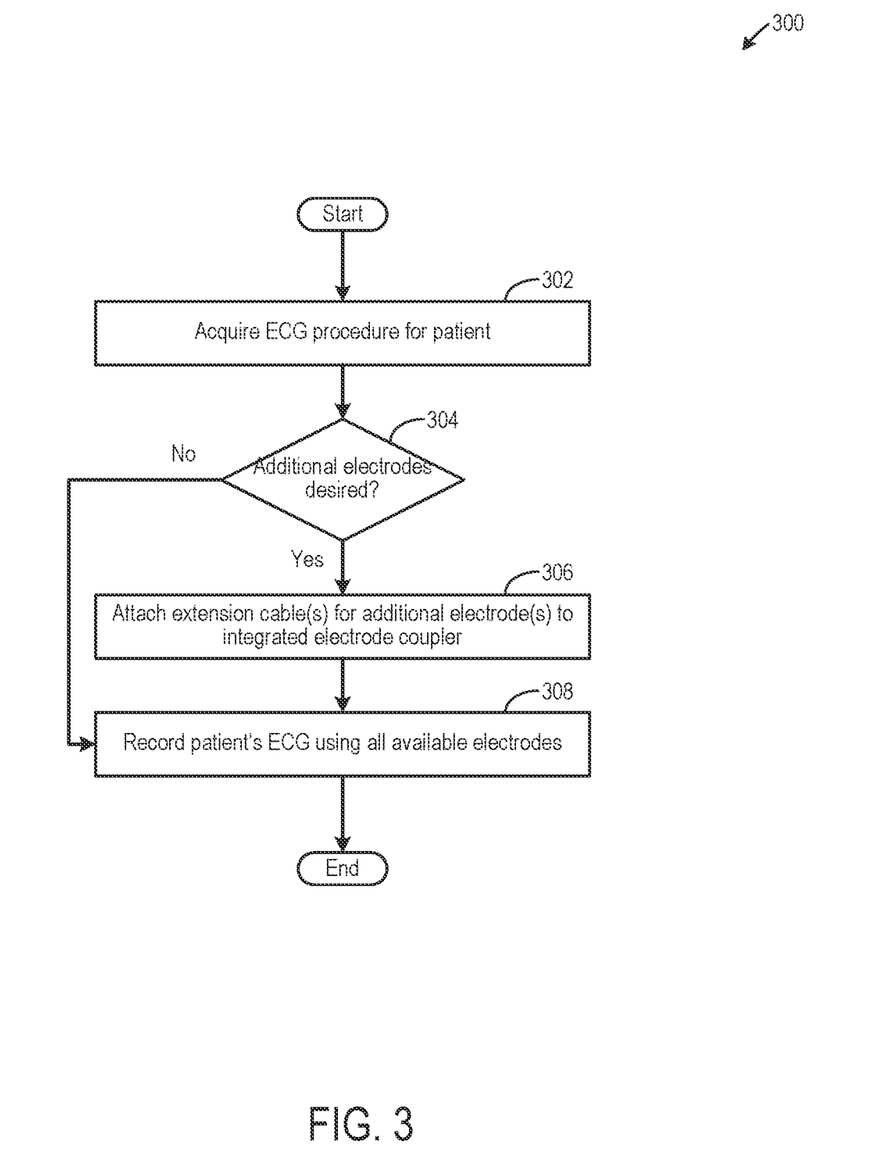
FIG. 3 shows a flow chart of a method for operating the ECG system of FIG. 2.

Turning now to FIG. 3, an example method 300 for operating a bio signal monitoring system such as the ECG system of FIG. 2 is shown. The method 300 is described with regard to the ECG system of FIGS. 1-2, although it may be appreciated that the method 300 may be implemented with other systems and components without departing from the scope of the present disclosure. The method 300 may be carried out according to instructions stored in non-transitory memory of a computing device, such as the data processing device 120 or controller of FIG. 1.

At 302, an ECG procedure to be used for a patient may be acquired by the ECG system. In one example, the procedure may be selected/indicated by an operator on a human machine interface (such as user input device 140 in FIG. 1) of the ECG system. In another example, the procedure may be selected based on previous health records and ECG monitoring of the patient. In yet another example, the procedure may be selected based on the physical characteristics (such as height, weight) of the patient.

At 304, the method includes determining if additional electrodes are desired for the acquired ECG procedure. In one example, the ECG system used for the procedure may include a number of permanent electrodes (such as five in FIG. 2) and one or more additional electrodes may be attached to the system based on the ECG procedure. If the acquired procedure includes more than the number of electrodes that are currently attached to the ECG system via a terminal, the method may proceed to 306. The controller may also determine the number of additional electrodes desired for the acquired ECG procedure. In some examples, the ECG system (e.g., data processing device 120 or controller) may automatically determine whether or not the desired number of electrodes are currently connected to the patient via a DC-lead off detection method (e.g., where a known DC current signal is passed through each electrode/connector and monitored to determine if each electrode is connected as expected). If the desired number of electrodes are not connected, the ECG system may output a notification instructing the operator to connect one or more additional (e.g., removable) electrodes.

At 306, one or more extension cables may be attached to an integrated electrode coupler (such as integrated electrode coupler 222 in FIG. 2) to attach one or more additional electrodes to the ECG system. As an example, the integrated electrode coupler may be configured to connect three electrodes to the terminal with one connection used to connect one fixed electrode, and two additional electrodes may be connected to the integrated electrode coupler via two additional extension cables. If one additional electrode is desired, the one electrode may be connected to the integrated electrode coupler via one extension cable. A connection between two electrodes or between an electrode and the terminal may form a lead. In this way, the ECG system configured with five fixed electrodes/leads may be converted into a six electrode/lead system based on the procedure selected. The electrodes may be placed on suitable positions on the patient's body.

At 308, the patient's ECG may be recorded based on the acquired ECG procedure. Two lead wires may be used to measure a specific electric potential difference between two electrodes positioned on the body of the patient. The data may then be processed and presented to the operator. If at 304 it is determined that additional electrodes are not desired for carrying out the acquired ECG procedure, the method may directly proceed to 308 to record the patient's ECG using the currently available number of electrodes.

In this way, during a first procedure, a first number of fixed electrodes may be used to monitor a bio signal of a patient (e.g., without using any removable electrodes), and during a second procedure, one or more removable electrodes may be attached to the monitoring system via one or more integrated electrode couplers, and then the first number of fixed electrodes and a second number of removable electrodes may be used to monitor the bio signal of the patient (or a different patient). Each of the first procedure and the second procedure may be selected by an operator, the second procedure using a higher number of electrodes relative to the first procedure.

In this way, by including an integrated electrode coupler connected to a terminal of an ECG system, it is possible to add extension cables and additional electrodes to selectively increase a number of leads in the ECG system. The technical effect of the flexibility of increasing and decreasing a number of leads in the ECG system is that portability, packaging, and mobility of a handheld/wearable ECG system may be improved.

In another representation, an ECG system includes a set of fixed connectors, each connector of the set of fixed connectors fixedly coupled to a terminal and configured to couple to a respective electrode, a multi-electrode coupler coupled to a first connector and a second connector of the set of fixed connectors and configured to couple to a first electrode of the respective electrodes, the multi-electrode coupler providing a first connection between the first electrode and the first connector and providing a second connection between a second electrode and the second connector, the second electrode configured to couple to the multi-electrode coupler via an extension cable. In a first example of the ECG system, the multi-electrode coupler includes an electrical pass-through connection for the extension cable without interference from any other connected extension cable or connected electrode. In a second example of the ECG system, optionally including the first example, the multi-electrode coupler is integrated with the first electrode. In a third example of the ECG system, optionally including one or both of the first and second examples, the multi-electrode coupler is removably coupleable to the first electrode.

In another representation, an ECG system includes a first electrode, a multi-electrode coupler coupled to the first electrode, a second electrode configured to removably couple to the multi-electrode coupler via an extension cable, a first connector coupled between the multi-electrode coupler and a terminal, and a second connector coupled between the multi-electrode coupler and the terminal. During operation of the ECG system, a first output signal from the first electrode is sent to the terminal via the multi-electrode coupler and the first connector and when the second electrode is coupled to the multi-electrode coupler, a second output signal from the second electrode is sent to the terminal via the extension cable, the multi-electrode coupler, and the second connector.

The disclosure also provides support for a bio signal monitoring system, comprising: an integrated electrode coupler configured to be selectively connected to one or more removable electrodes via one or more corresponding extension cables, the integrated electrode coupler providing an electrical pass-through connection for each connected extension cable without interference from any other connected extension cable or connected electrode. In a first example of the system, the bio signal monitoring system is an electrocardiograph (ECG) system including a first number of fixed ECG connectors connected to a corresponding first number of fixed electrodes. In a second example of the system, optionally including the first example, the integrated electrode coupler is connected to one of the fixed electrodes and one of the fixed ECG connectors. In a third example of the system, optionally including one or both of the first and second examples, the integrated electrode coupler is connected to a terminal of the bio signal monitoring system via the one of the fixed ECG connectors, the one of the fixed ECG connectors comprising two or more isolated wires. In a fourth example of the system, optionally including one or more or each of the first through third examples, the terminal includes one or more of a data acquisition unit, a data storage unit, and a data processing device. In a fifth example of the system, optionally including one or more or each of the first through fourth examples, each of the fixed electrodes is configured to transfer a signal to the terminal via a respective fixed ECG connector. In a sixth example of the system, optionally including one or more or each of the first through fifth examples, each of the one or more removable electrodes is configured to transfer a signal to the terminal via one of the one or more corresponding extension cables and one of the two or more isolated wires.

The disclosure also provides support for an electrocardiograph (ECG) system, comprising: a first set of electrodes directly connected to a terminal, and one or more additional electrodes configured to be selectively and indirectly connected to the terminal via one or more integrated electrode couplers and corresponding extension cables, wherein the one or more integrated electrode couplers provide an electrical pass-through connection for the one or more additional electrodes without interference from any of the first set of electrodes. In a first example of the system, each of the one or more integrated electrode couplers is connected to the terminal via at least two connectors, one of the at least two connectors connected to an electrode of the first set of electrodes and another of the at least two connectors connected to another electrode of the one or more additional electrodes. In a second example of the system, optionally including the first example, a number of the one or more additional electrodes is equal to a number of extension cables configured to be connected to the one or more integrated electrode couplers, the one or more additional electrodes being removable from the ECG system. In a third example of the system, optionally including one or both of the first and second examples, the system further comprises: one or more single electrode couplers connected to the terminal, each of the one or more single electrode couplers connecting one corresponding electrode of the first set of electrodes to the terminal, each electrode of the first set of electrodes being a fixed electrode of the ECG system. In a fourth example of the system, optionally including one or more or each of the first through third examples, each of the one or more single electrode couplers and the one or more integrated electrode couplers is connected to the terminal via a central connector. In a fifth example of the system, optionally including one or more or each of the first through fourth examples, the first set of fixed electrodes include five electrodes. In a sixth example of the system, optionally including one or more or each of the first through fifth examples, the ECG system is a portable and/or a wearable device including the terminal, the terminal including one or more of a data acquisition unit, a data storage unit, a data processing device, and a communication system.

The disclosure also provides support for a method for a bio signal monitoring system, comprising: during a first procedure, using a first number of fixed electrodes to monitor a bio signal of a patient, and during a second procedure, attaching one or more removable electrodes to the monitoring system via one or more integrated electrode couplers, and then using the first number of fixed electrodes and a second number of removable electrodes to monitor the bio signal of the patient. In a first example of the method, each of the first procedure and the second procedure is selected by an operator, the second procedure using a higher number of electrodes relative to the first procedure. In a second example of the method, optionally including the first example, each removable electrode is connected to one integrated electrode coupler of the one or more integrated electrode couplers via a respective extension cable. In a third example of the method, optionally including one or both of the first and second examples, during the second procedure, each integrated electrode coupler of the one or more integrated electrode couplers is connected to one fixed electrode and one removable electrode. In a fourth example of the method, optionally including one or more or each of the first through third examples, the method further comprises, upon completion of the second procedure, detaching the second number of removable electrodes from the bio signal monitoring system, the second number smaller than the first number. In a fifth example of the method, optionally including one or more or each of the first through fourth examples, the bio signal monitoring system is an electrocardiograph (ECG) system including a terminal connected to each of the fixed electrodes and the removable electrodes.

As used herein, an element or step recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A bio signal monitoring system, comprising:
   a fixed electrode configured to connect to a bio signal monitoring system via a cable; and
   an integrated electrode coupler adapted to be attached to a body of a patient, comprising first and second divisions, each comprising an electrical connector;
   wherein the fixed electrode is configured to directly connect to the electrical connector of the first division and transmit a signal acquired by the fixed electrode to the bio signal monitoring system via the cable,
   wherein a removable electrode is configured to selectively connect to the electrical connector of the second division via a removably connectable extension cable, and
   wherein a first end of the extension cable is in contact with the electrical connector of the second division and a second end of the extension cable is directly connected to the removable electrode and transmit another signal acquired by the removable electrode to the bio signal monitoring system via the extension cable and an electrical pass-through wire of the cable without interfering with the signal of the fixed electrode.

2. The system of claim 1, wherein the bio signal monitoring system is an electrocardiograph (ECG) system including additional number of fixed electrodes and corresponding ECG connectors.

3. The system of claim 2, wherein the integrated electrode coupler is connected to a terminal of the bio signal monitoring system, wherein the cable further comprises an isolated wire.

4. The system of claim 2, wherein the terminal includes one or more of a data acquisition unit, a data storage unit, and a data processing device.

5. The system of claim 3, wherein the fixed electrode is configured to transfer electrocardiogram (ECG) signal to the terminal.

6. An electrocardiograph (ECG) system, comprising:
a set of fixed electrodes directly connected to a terminal of an ECG monitoring system via a plurality of cables, the set of fixed electrodes comprising a fixed electrode, wherein the fixed electrode is connected to a cable of the plurality of cables; and
one or more removable electrodes connected to the terminal of the ECG monitoring system via one or more integrated electrode couplers and a plurality of removably connectable extension cables, the one or more removable electrodes comprising a removable electrode connected to a removably connectable extension cable of the plurality of removable connectable extension cables;
the one or more integrated electrode couplers adapted to be attached to a body of a patient, each comprising first and second divisions having a respective electrical connector;
wherein the fixed electrode is configured to directly connect to the electrical connector of the first division of the one of the one or more integrated electrode coupler and transmit an ECG signal acquired by the fixed electrode to the ECG monitoring system via the cable,
wherein the removable electrode is configured to selectively connect to the electrical connector of the second division of the one of the one or more integrated electrode coupler via the removably connectable extension cable, and
wherein a first end of the extension cable is in contact with the electrical connector of the second division of the one of the one or more integrated electrode and a second end of the extension cable is directly connected to the removable electrode and transmit another ECG signal acquired by the removable electrode to the ECG monitoring system via the removably connectable extension cable and an electrical pass-through wire of the cable without interfering with the ECG signal of the fixed electrode.

7. The system of claim 6, wherein a number of the one or more removable electrodes is equal to a number of the plurality of removably connectable extension cables configured to be connected to the one or more integrated electrode couplers.

8. The system of claim 6, further comprising one or more single electrode couplers connected to the terminal, each of the one or more single electrode couplers connected to a corresponding fixed electrode of the set of fixed electrodes.

9. The system of claim 8, wherein a central connector comprises the plurality of cables and each of the one or more single electrode couplers and the one or more integrated electrode couplers is connected to the terminal via the central connector, and wherein the terminal comprises components of the ECG system and data processing devices.

10. The system of claim 6, wherein the set of fixed electrodes include five electrodes.

11. The system of claim 6, wherein the ECG system is a portable and/or a wearable device including the terminal, the terminal including one or more of a data acquisition unit, a data storage unit, a data processing device, and a communication system.

12. A method for a bio signal monitoring system, comprising:
a first procedure, using a first number of fixed electrodes of the set of fixed electrodes of claim 8 to monitor a first procedure ECG signal of the patient; and
during a second procedure, attaching the one or more removable electrodes of claim 8 to the ECG monitoring system via the one or more integrated electrode couplers, and then using the first number of fixed electrodes and a second number of removable electrodes of the one or more removable electrodes to monitor a second procedure ECG signal of the patient,
wherein the one or more integrated electrode couplers is coupled directly to the first number of fixed electrodes and indirectly coupled to the second number of removable electrodes, wherein the one or more electrode couplers is configured to be coupled to the body of the patient.

13. The method of claim 12, wherein each of the first procedure and the second procedure is selected by an operator, the second procedure using a higher number of electrodes relative to the first procedure.

14. The method of claim 12, wherein each removable electrode of the one or more removable electrodes is connected to one integrated electrode coupler of the one or more integrated electrode couplers via a respective removably connectable extension cable of the plurality of removably connectable extension cable.

15. The method of claim 14, wherein during the second procedure, each integrated electrode coupler of the one or more integrated electrode couplers is connected to one of the set of fixed electrodes and one of the one or more removable electrodes.

16. The method of claim 12, further comprising, upon completion of the second procedure, detaching the second number of removable electrodes from the ECG monitoring system, the second number of the removable electrodes being smaller than the first number of fixed electrodes.

* * * * *